United States Patent
Corcoran

(10) Patent No.: US 7,503,587 B2
(45) Date of Patent: Mar. 17, 2009

(54) APPARATUS AND METHODS FOR FACILITATING SEAT BELT FASTENING

(76) Inventor: Dan Earl Corcoran, 10533 Forest Ridge Pl., Beaverton, OR (US) 97007

( * ) Notice: Subject to any disclaimer, the term of this patent is extended or adjusted under 35 U.S.C. 154(b) by 528 days.

(21) Appl. No.: 11/202,680

(22) Filed: Aug. 12, 2005

(65) Prior Publication Data

US 2007/0035119 A1  Feb. 15, 2007

(51) Int. Cl.
*B60R 22/00* (2006.01)
(52) U.S. Cl. .................... 280/801.1; 297/468
(58) Field of Classification Search .......... 280/801.1, 280/802; 297/481, 468; 24/198, 633; *B60R 22/00*
See application file for complete search history.

(56) References Cited

U.S. PATENT DOCUMENTS

| | | | |
|---|---|---|---|
| 4,291,919 A * | 9/1981 | Schmid et al. | 297/483 |
| 4,685,740 A * | 8/1987 | Fohl | 297/468 |
| 4,925,246 A | 5/1990 | Corcoran | |
| 4,944,557 A * | 7/1990 | Tsubai | 297/468 |
| 4,995,672 A * | 2/1991 | Corcoran | 297/483 |
| 5,954,397 A * | 9/1999 | Czernakowski et al. | 297/250.1 |
| 5,992,884 A | 11/1999 | Gillespie et al. | |
| 6,484,369 B1 * | 11/2002 | Conaway | 24/163 R |
| 6,520,392 B2 * | 2/2003 | Thibodeau et al. | 224/275 |
| 6,634,064 B2 * | 10/2003 | Finotti | 24/198 |
| 7,137,649 B2 * | 11/2006 | Eusebi | 280/806 |
| 2003/0088953 A1* | 5/2003 | Finotti | 24/633 |
| 2007/0035119 A1* | 2/2007 | Corcoran | 280/801.1 |

\* cited by examiner

*Primary Examiner*—John Q. Nguyen
*Assistant Examiner*—Karen Amores
(74) *Attorney, Agent, or Firm*—Kolisch Hartwell, P.C.

(57) ABSTRACT

A seat belt facilitator for use with a passenger restraint system having a belt webbing, a latch plate coupled to the belt webbing, and a buckle assembly adapted to be releasably coupled to the latch plate. The facilitator includes a latch plate receiving region adapted to releasably couple the facilitator to the latch plate. The facilitator further includes a web coupling region adjacent the latch plate receiving region and adapted to slidably couple the facilitator to the belt webbing. Additionally, the facilitator includes a handle region separated from the receiving region at least by the web coupling region. The facilitator is adapted to enable a user to couple the latch plate to the buckle assembly from a position remote from the buckle assembly.

21 Claims, 3 Drawing Sheets

APPARATUS AND METHODS FOR FACILITATING SEAT BELT FASTENING

FIELD OF THE INVENTION

The present disclosure is related to apparatus and methods for facilitating the fastening of seat belts.

BACKGROUND

Motor vehicles are currently required to be equipped with seat belt systems, or passenger restraint systems, for the protection of vehicle occupants in the event of sudden stops or impact of the vehicle with another vehicle or other object. Conventional vehicle seat belt systems are normally provided with belt webbing attached at opposing ends to the body of the vehicle. Depending on the configuration of the restraint system, the opposing ends of the belt webbing may be attached to the vehicle body adjacent to each other or one end may be attached at the seat level while the other end is attached at the shoulder level. In many current configurations, one end of the belt webbing is operatively associated with a retractor assembly attached to the body of the vehicle body. In some configurations, such as in association with rear seats, the retracting device is positioned at or above shoulder level and the opposite end of the belt is attached to the vehicle body at seat level. Seat belt systems customarily include a latch plate slidably coupled to the belt webbing between the opposing ends.

To use the seat belt, an individual pulls the latch plate and fastens the latch plate to a buckle assembly secured to the vehicle body, thus providing a conventional three-point seat belt attachment. Such a three-point seat belt attachment arrangement is commonly known as a Type-II auto restraint system. When pulled, the latch plate divides the length of seat belt into two belt portions, a lap belt portion and a shoulder belt portion. The lap belt portion lies across the lap, or waist, of the vehicle occupant. The shoulder belt portion routes across the chest and shoulder of the vehicle occupant when the belt is properly fastened.

Conventional Type II restraints generally include a retractor assembly to apply tension to the belt webbing. The retractor is customarily spring biased to provide a minimal amount of restraint against movement, while also providing a taught belt webbing. Additionally, the retractor assembly often includes a ratchet mechanism that is configured to selectively lock the seat belt system so that the belt webbing has a fixed, maximum operational length. A number of ratchet mechanisms are available, some of which are configured to lock under two circumstances: upon activation by sudden deceleration, such as occurs in a crash, or upon drawing the belt webbing from the retractor to a predetermined length, such as by pulling a substantial portion of the belt webbing from the retractor assembly. Once the ratchet mechanism is engaged, the belt webbing may be retracted by the spring bias of the retractor assembly. Once retracted with the ratchet mechanism engaged, the belt webbing cannot be drawn from the retractor again until a predetermined amount of belt webbing is withdrawn into the retractor assembly.

The National Highway Traffic Safety Administration has mandated that prisoners be seat-belted in with a "three-point," or Type II, restraint having a crossing shoulder strap and a lap belt as well. Since the prisoner is most often handcuffed behind his back, an officer, rather than the prisoner, must perform the act of latching the seatbelt. It is difficult and sometimes dangerous to apply the conventional, factory-installed seat belt system on a prisoner, especially when he/she is unwilling or is resisting being restrained. The act of inserting the latch plate into the buckle also renders the officer vulnerable to attack by the prisoner (biting, spitting, head butting, etc).

In the case of transporting prisoners, it is desirable during transport to tightly secure the occupant securely in an upright position. This upright position is desired for the safety of the occupant because it will keep his airway clear and provides the best position in the event of a crash. Additionally, a secured upright position helps to prevent the occupant from causing destruction to the inside of the vehicle, such as kicking out the windows. To secure the occupant in a Type-II restraint, it is necessary to engage the ratchet mechanism by pulling substantially all of the belt webbing from the retractor and allowing the desired amount to be withdrawn by the retractor to provide a secure seat belt. Engaging the ratchet assembly generally requires pulling at least three to four feet of webbing from the assembly, which is inconvenient and awkward in any circumstance and possibly dangerous when seat belting a prisoner.

SUMMARY

A seat belt facilitator is provided for use with a passenger restraint system. The passenger restraint system includes a belt webbing, a latch plate coupled to the belt webbing, and a buckle assembly adapted to be releasably coupled to the latch plate. The seat belt facilitator comprises a latch plate receiving region adapted to releasably couple the facilitator to the latch plate. The facilitator further may include a web coupling region adjacent the latch plate receiving region. The web coupling region may be adapted to slidably couple the facilitator to the belt webbing. The seat belt facilitator may also include a handle region separated from the receiving region at least by the web coupling region. The facilitator is adapted to enable a user to couple the latch plate to the buckle assembly from a position remote from the buckle assembly.

DETAILED DESCRIPTION

Figure 1:
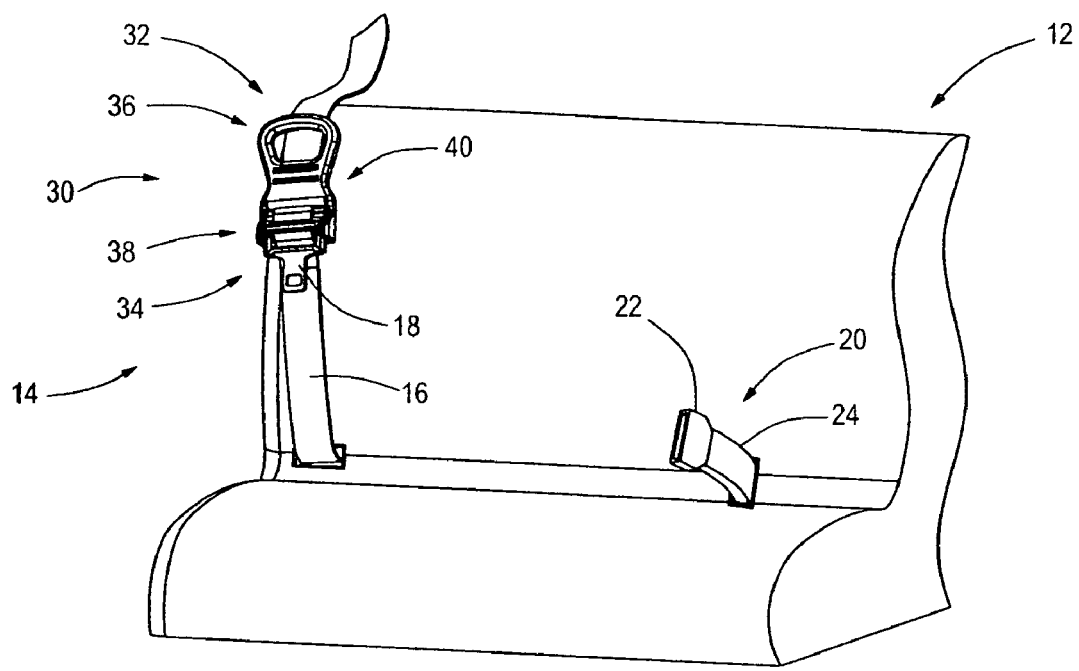
FIG. 1 is a frontal view of a conventional vehicle seat and passenger restraint system having a seat belt facilitator coupled to the belt webbing and showing the passenger restraint system in an unbuckled configuration.

FIG. 1 illustrates a frontal view of a conventional passenger seat 12 including a passenger restraint system 14. Passenger restraint system 14 includes a belt webbing 16 and a latch plate 18 coupled to the belt webbing. Belt webbing 16 may be coupled to the vehicle in any suitable manner, including via retractor mechanisms common in vehicle restraint systems. The restraint system 14 also includes a buckle assembly 20. Buckle assembly 20 includes a buckle 22 and a tether 24. Tether 24 couples buckle 22 to the vehicle in any suitable manner.

Passenger seat 12 and passenger restraint system 14 are illustrated somewhat schematically and are representative of any conventional passenger seat and restraint system commonly in use in vehicles such as cars, trucks, vans, etc. For example, passenger seat 12 may be a bucket seat, a bench seat, or other structure used to transport passengers. Restraint system 14 may include any suitable system of belts and other apparatus for securing or restraining an occupant in the seat, either during transportation or in the event of a crash. For example, restraint system 14 may include a three-point system such as described above and illustrated in FIG. 1. Alternatively, restraint system 14 may include a single lap belt, a single shoulder belt, a system having a shoulder belt and a lap belt, or any other suitable combination of belts and buckles. The particular locations and orientations of the restraint system illustrated in the present disclosure are merely exemplary and are not limiting.

FIG. 1 further illustrates a seat belt facilitator 30 according to the present disclosure coupled to passenger restraint system 14 and releasably coupled to latch plate 18. Seat belt facilitator 30 includes a handle end 32 and a receiving end 34. Facilitator 30 is illustrated somewhat schematically in FIG. 1, showing a handle region 36, a receiving region 38, and a web coupling region 40. The web coupling region 40 is disposed between the handle end 32 and the receiving end 34 and is adapted to slidably couple the facilitator to the belt webbing 16 of restraint system 14. Receiving region 38 is adapted to selectively couple facilitator 30 to latch plate 18 of the passenger restraint system 14. The handle region 36 is separated from the receiving region at least by the web coupling region 40.

Seat belt facilitator 30 is illustrated in FIG. 1 coupled to a conventional passenger restraint system of a vehicle. Notably, facilitator 30 includes web coupling region 40 that may be adapted to allow the facilitator to be coupled to a belt webbing without disconnecting the belt webbing from the vehicle or otherwise customizing the restraint system 14. Accordingly, the facilitator may be used with factory installed restraint systems. While the facilitator 30 may be used in cooperation with conventional passenger restraint systems, the seat belt facilitator may also be used with customized or after-market restraint systems. For example, facilitator 30 may be adapted for use with passenger restraint systems such as described in U.S. Pat. No. 4,925,246 or 4,995,672, each of which is incorporated herein by reference in their entirety for all purposes. In some applications, facilitator 30 including web coupling region 40 may not be configured to couple to factory installed restraint systems. For example, facilitator 30 may be constructed as a solid article without separable or moving parts. Such facilitators may be used with after-market passenger restraint systems, in after-market modified factory systems, or by seat belt manufacturers that pre-install a facilitator according to the present disclosure prior to installing the restraint system in a car during manufacturing.

With continued reference to FIG. 1, passenger restraint system 14 is illustrated with an interior side, which includes those portions facing the seat, and an exterior side, which generally faces away from the seat. Facilitator 30 may be coupled to belt webbing 16 such that handle region 36 is on the exterior side of the restraint system. Such a configuration presents the handle region in a more easily accessible location. As passenger restraint systems come in a number of models and configurations, facilitator 30 may be configured to cooperate with one or more of the various styles. In some applications, handle region 36 may be disposed on the interior side of belt webbing 16. Depending on the configuration of latch plate 18 and belt webbing 16, facilitator 30 may be adapted to position handle region 36 and receiving region 38 on opposing sides of the belt webbing. Additionally or alternatively, handle region 36 and receiving region 38 may be coupled to the restraint system such that they are on the same side. A suitable orientation of facilitator 30 positions receiving region 36 in operative association with latch plate 18 to receive the latch plate and enable sliding movement of facilitator 30 and latch plate 18. Due to the variety of passenger restraint system styles and configurations, some facilitators 30 according to the present disclosure may include additional belt webbing passages or other features to enable handle region 36 to be disposed on the exterior side of belt webbing 16 to make it more easily accessible. However, facilitators may also be configured to position the handle region on the interior side of the belt webbing.

Conventional passenger restraint systems are designed to be applied by the passenger being restrained. That is, a passenger in the vehicle typically applies his/her own safety belt. In such circumstances, the relatively small latch plate 18 and buckle 22 present little difficulty for the passenger to apply. However, there are many circumstances when a person is applying a safety belt around the occupant of a seat. For example, a police officer often secures the safety belts of the detainees or prisoners transported in police vehicles. Also, parents or care providers of special needs individuals, such as those with physical or mental impairments, often apply the safety belts of the special needs individuals. Similarly, parents apply the safety belts for the infant or toddler seats of their children. As used herein, infant seat will be used generally to refer to the various types of safety seats used to safely secure infants, toddlers, and small children in a vehicle. In such circumstances, the person applying the safety belt must reach the belt webbing and latch plate around the person or infant seat being belted in and direct the latch plate into the buckle.

When a person other than the occupant of the seat is applying the restraint system, the applying person generally must put a substantial portion of his/her body into the car across the body of the occupant to see the buckle assembly and to guide the buckle assembly and latch plate together. When applying a passenger restraint system to an infant seat, this can be complicated by the structure of the passenger seat. When applying a restraint system to a special needs person or a prisoner, the body of the occupant may be too large to allow the applying person to adequately see the buckle assembly or to adequately guide the latch plate into the buckle assembly. And in the case of a prisoner, police officers would often prefer to not extend their bodies into the car in such proximity to a prisoner.

Figure 2:
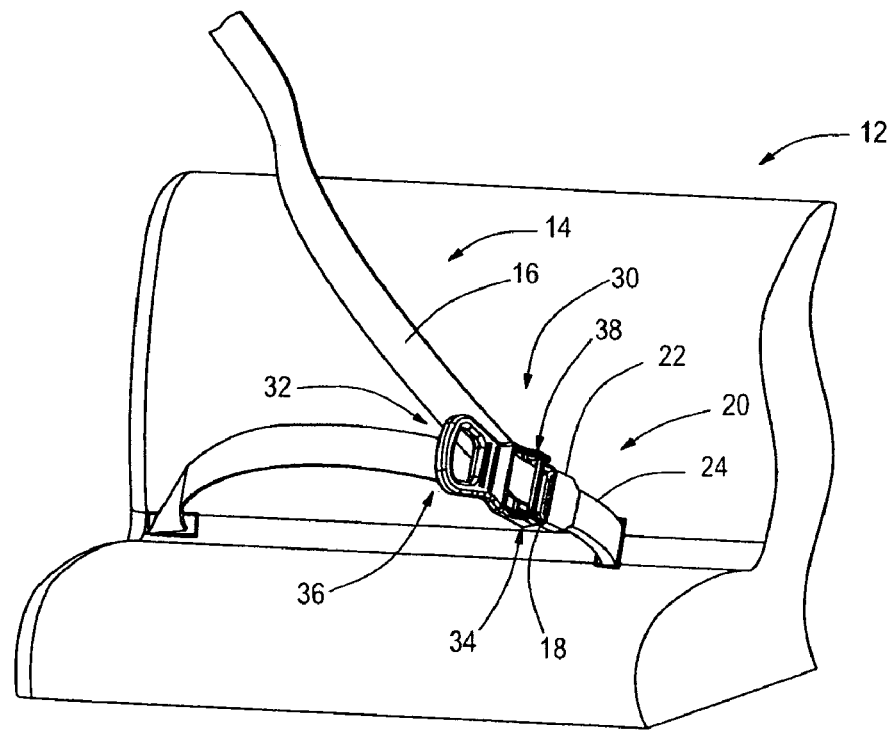
FIG. 2 is a frontal view of the vehicle seat of FIG. 1 showing the seat belt facilitator guiding the latch plate of the restraint system into the buckle assembly.

FIG. 2 illustrates a frontal view of the passenger seat 12 of FIG. 1 showing the passenger restraint system 14 in a buckled configuration after seat belt facilitator 30 has been used to guide latch plate 18 to buckle assembly 20. Latch plate 18 and buckle assembly 20 may be releasably coupled together through any suitable mechanism. As seen in FIG. 2, buckle assembly 20 may include a tether 24, which may be a conventional tether or may have a greater length than conventional restraint systems. In some applications of passenger restraint systems, such as when restraining prisoners, an extended tether 24 may make it easier to buckle the passenger in place without having to reach all the around the prisoner passenger to the base of the seat. In some embodiments, the tether 24 may be configured with substantially rigid portions or members such that the buckle 22 is maintained elevated from the seat or in a substantially fixed position. A substantially rigid tether 24 may enable one-handed operation of facilitator 30 to buckle the restraint system and secure the occupant in the seat as a second hand would not be needed to apply the opposing force to the buckle assembly.

With continued reference to FIG. 2 and with reference to FIG. 1, the operation of passenger restraint system 14 equipped with facilitator 30 can be understood. From the starting position of FIG. 1, the person applying the restraint system grasps handle region 36 of facilitator 30 and moves the facilitator in the direction of buckle assembly 20 across the body of the seat occupant (not shown) to guide latch plate 18 into buckle 22. Additionally or alternatively, when the starting position of the restraint system is such that facilitator 30 is separated from latch plate 18, facilitator 30 may be slidingly moved along belt webbing 16 to meet latch plate 18. As discussed above, facilitator 30 includes a receiving region 38 adapted to releasably couple to the latch plate. Upon meeting latch plate 18, receiving region 38 engages the latch plate and slidingly guides the latch plate along belt webbing 16 to buckle assembly 20.

Facilitator 30 conveniently provides a handle region 36 that extends away from latch plate 18. Accordingly, a user applying the restraint system to a seat occupant will not have to reach as far to guide latch plate 18 into buckle 22. The extent to which the applying user is relieved of reaching around the occupant may depend at least on the length of facilitator 30 between handle end 32 and receiving end 34 and on the length and configuration of buckle assembly 20. Facilitator 30 provides the user with the ability to couple latch plate 18 to buckle 22 from a position remote from buckle assembly 20. As used herein, a position remote from the buckle assembly is used to indicate that the hand guiding the latch plate is remote from the buckle assembly, such as spaced apart from the buckle by the length of facilitator 30.

In some applications, such as securing a prisoner, a rigid buckle tether 24 extending upward from the seat between six and sixteen inches, or more, may be used to allow use of a shorter facilitator while still allowing the police officer to remain substantially outside of the vehicle while securing the restraint with one-handed operation. In other applications, such as securing an infant seat, a conventional buckle tether may be used. In such applications, it may be desirable to have a facilitator up to twenty-four inches long, particularly if the facilitator is releasably coupled to the belt webbing. When the buckle assembly includes a conventional, non-rigid tether, the user may need to use a second hand or another person to position the buckle assembly for coupling with the latch plate. However, the facilitator may be adapted to enable the user to thread the latch plate through the structure of an infant seat without requiring the user to push his/her hand through the infant seat. Accordingly, the facilitator enables a user to remotely couple the latch plate to the buckle without scraping and pinching his/her hand, wrist, and forearm.

Figure 3:
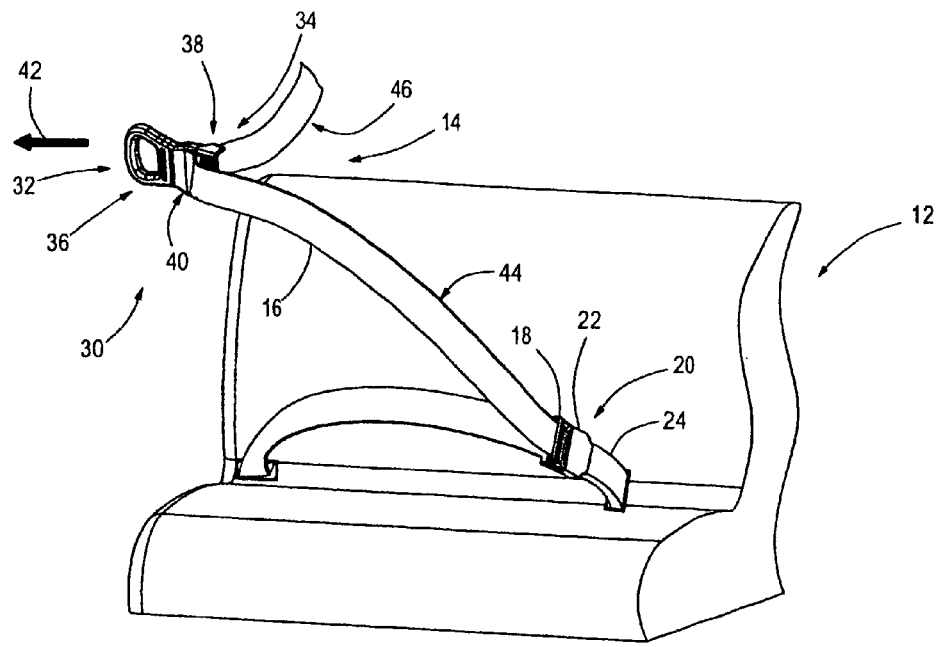
FIG. 3 is a frontal view of the vehicle seat of FIG. 1 illustrating the facilitator being used to draw the belt webbing from a retractor assembly.

With reference to FIG. 3, facilitator 30 is illustrated as it may be used to draw the belt webbing from a retractor assembly. As described above, passenger restraint systems 14 often include a retractor assembly (not shown) adapted to apply tension to belt webbing 16. The retractor assembly is customarily spring biased to provide a minimal amount of restraint against movement, while also providing a taught belt webbing. Additionally, the retractor assembly often includes a ratchet mechanism that is configured to selectively lock the passenger restraint system so that the belt webbing has a fixed, maximum operational length. Many current passenger restraint systems, such as used on vehicular rear seats, include ratchet mechanisms that are configured to lock under two circumstances: upon activation by sudden deceleration, such as occurs in a crash, or by drawing the belt webbing from the retractor to a predetermined length, such as by pulling substantially all of the belt webbing from the retractor assembly. Some retractor assemblies and ratchet mechanisms are configured with multiple systems and components to enable different lock and release characteristics depending on how the lock was engaged. In systems that enable engagement of the ratchet mechanism by drawing the belt webbing from the retractor assembly, the belt webbing may be retracted by the spring bias of the retractor assembly once the ratchet mechanism is engaged. Once retracted with the ratchet mechanism engaged, the belt webbing cannot be drawn from the retractor again until the belt webbing is substantially completely withdrawn into the retractor assembly. Accordingly, the belt webbing can be drawn to substantially its fullest length and allowed to retract to a desired length, such as to provide a snug fit around an occupant or to secure an infant seat. That desired length then becomes a pre-set maximum length until the belt webbing is retracted into the retractor assembly substantially close to its default length.

When passenger restraint system 14 is used to secure a prisoner or an infant seat, it is generally desirable that the restraint be applied with a pre-set maximum length to minimize the movement of the occupant or apparatus within the restraint. For prisoners, it is desirable to keep the occupant upright to help keep the airways clear and to help prevent the prisoners from kicking the doors and windows. For infant or special needs seats, the pre-set length secures the seat in an upright condition so that it is fixed within the seat. Accordingly, in such applications, a user applying restraint system 14 will generally need to at least substantially fully draw belt webbing 16 from the retractor assembly to engage the ratchet mechanism.

Passenger restraint systems are generally provided with a substantial length of belt webbing. Depending on the size of the occupant or infant seat being restrained, there may be several feet of webbing stored in the retractor assembly after the latch plate is secured to the buckle. In conventional restraint systems, a user must draw that length of webbing from the retractor assembly by pulling at the shoulder end of the exposed belt webbing, often resulting in a pile of webbing at the edge of the seat after repeated pulls. The repeated pulls to reach the end of the webbing also requires the user to come in close proximity with the occupant repeatedly and must pull using both hands to prevent the belt webbing from retracting between pulls. The conventional method of drawing the belt webbing is further complicated in the case of restraining prisoners where the repeated pulls brings the officer in potentially hazardous proximity to the prisoner. Moreover, the repeated pulls extends the amount of time the prisoner is relatively free to move within the car, which poses a number of risks to the officer and the prisoner.

With continuing reference to FIG. 3, seat belt facilitator 30 may be used to provide a single-handed latch and lock capability to a passenger restraint system. As described above in connection with FIG. 2, facilitator 30 may be used to couple (or latch) latch plate 18 to buckle 22 and may enable single-handed operation. Once latch plate 18 is coupled to buckle 22, facilitator 30 may be pulled away from latch plate 18 to decouple therefrom. As indicated above and described more fully herein, receiving region 34 may be configured to be releasably coupled to latch plate 18. Accordingly, a slight pull will generally decouple facilitator 30 from latch plate 18. The releasable coupling of facilitator 30 to latch plate 18 may be desirable when the facilitator is used to engage the ratchet mechanism, as described below, or to provide greater control over the position of facilitator 30 when it is not being used to guide the latch plate to the buckle assembly.

With facilitator 30 decoupled from latch plate 18, web coupling region 40, which slidably couples the facilitator to belt webbing 16, allows facilitator 30 to slide along the belt webbing to a point away from latch plate 18. The user may then continue to pull facilitator 30 in a direction away from the retractor assembly to continue to draw the belt webbing from the retractor assembly. With continued pulling, such as indicated by arrow 42, facilitator 30 will eventually pull substantially all of the belt webbing from the retractor assembly and will engage the ratchet mechanism. The convenient, one-handed pulling operation enable by facilitator 30 allows a user to maintain a substantially uniform tautness in the belt webbing throughout the process of drawing the webbing from the retractor assembly. Once the ratchet mechanism is engaged, facilitator 30 can be released, or controllably released, to allow the retractor assembly to withdraw the extra length of belt webbing to set the maximum web length for that use.

Facilitator 30 may pull belt webbing 16 from any suitable position along the length thereof. As illustrated in FIG. 3, facilitator 30 is adapted to pull from a position along the shoulder belt (i.e., between latch plate 18 and the shoulder region of the occupant) of the belt webbing. Alternatively, facilitator 30 may be adapted to pull belt webbing 16 from a position along the lap belt (i.e., between latch plate 18 and the opposite hip region of the occupant) of the belt webbing. The portion of belt webbing 16 that is pulled by facilitator 30 may depend at least in part on the configuration of the passenger restraint system and retractor assembly.

With continued reference to FIG. 3, facilitator 30 may be adapted to pull belt webbing 16 from a fixed position on the length of the belt webbing, such as by including stops along the length of the belt webbing. Alternatively, facilitator 30 and belt webbing 16 may be configured such that facilitator 30 is in sliding engagement with substantially the entire length of the belt webbing and can therefore pull from any position along the length thereof. Additionally or alternatively, facilitator 30 may be adapted to allow the position of the facilitator to vary as it is pulling belt webbing 16 from the retractor assembly.

FIG. 3 illustrates that when facilitator 30 is used to draw belt webbing 16 from the retractor assembly, the belt webbing is divided into two portions by the facilitator: a torso portion 44 and a shoulder portion 46. Depending on how facilitator 30 is pulled away from retractor assembly and how far it is allowed to slide along belt webbing 16, facilitator 30 may divide belt webbing 16 into shoulder portion 46 and torso portion 44 of the same or different lengths. In some configurations within the scope of the present disclosure, facilitator 30 and belt webbing 16 may be adapted such that the vertex formed by facilitator 30 slides along the length of belt webbing 16 while pulling and adjusts to divide belt webbing 16 into substantially equal shoulder portion 46 and torso portion 44. By dividing belt webbing 16 into a shoulder portion and a torso portion of substantially the same length, the distance to which facilitator 30 must be pulled to engage the ratchet mechanism can be minimized.

Figure 4:
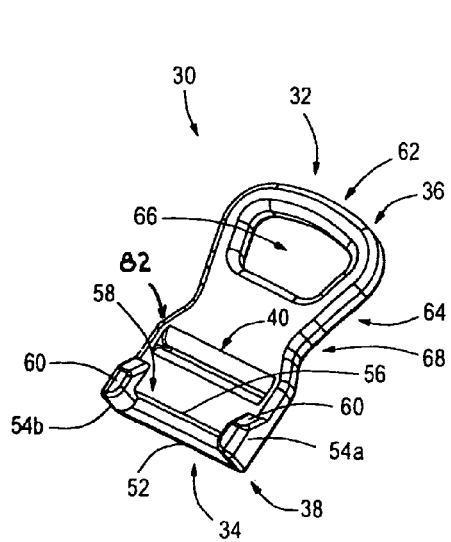
FIG. 4 is a schematic perspective view of a seat belt facilitator according to the present disclosure.

FIG. 4 illustrates a schematic view of facilitator 30 within the scope of the present disclosure. As illustrated in FIGS. 1-3, facilitator 30 includes a receiving end 34 and a handle end 32. Facilitator 30 also includes a receiving region 38 and a handle region 36 spaced apart by a web coupling region 40. Receiving region 38 is shown schematically in FIG. 4 to illustrate that receiving region 38 may be configured to releasably couple to any latch plate that may be used with a passenger restraint system. Different vehicle manufacturers provide latch plates of different styles and geometries; receiving region 38 may be molded or otherwise adapted to cooperate with one or more of these various styles.

As shown in FIG. 4, receiving region 38 includes a back wall 52, a pair of opposing side walls 54a, 54b, and a top wall 56. Receiving region 38 also may include a substantially open front region 58 as shown. Side walls 54 may project at any suitable angle from back wall 52, such as at right angles or angles proximate thereto. Additionally, side walls 54 may include an inwardly extending flange portion 60 adapted to close at least a portion of the front region. As illustrated, flanges 60 may be disposed on the front edge of the side walls to form a partial front wall. Flanges 60 may be adapted to help receive latch plate 18 and to hold it in place. Additionally, flanges 60 may include rearwardly sloping portions near the top wall 56 to cooperate with the top wall in receiving and guiding the latch plate. Top wall 56 may be a flat wall extending between side walls 54 and projecting from back wall 52. Alternatively or additionally, top wall 56 may include projections, pockets, grooves, or other structural features to correspond with latch plate 18. In some configurations, top wall 56 may be formed exclusively by downwardly sloping portions of flanges 60. Receiving region 38 may be configured to include additional or fewer features to enable the receiving region to releasably couple to latch plate 18. Customized receiving regions suitable for specific latch plates as well as universal receiving regions suitable for several latch plate configurations are within the scope of the present disclosure.

Handle region 36 is also illustrated somewhat schematically in FIG. 4. Handle region 36 may include a grip 62 to aid the user in guiding facilitator 30 toward the buckle assembly or to aid in pulling facilitator 30 away from the retractor assembly. As illustrated, grip 62 may be provided in the form of a taper 64 from handle end 32 towards receiving end 34 or in the form of a hole 66 through handle region 36. Grip 62 may be provided by other suitable structures and handle region 36 may not include a structural grip feature. When facilitator 30 includes a hole 66, the hole may be adapted to conform to a user's hand. Alternatively, hole 66 may be smaller than a user's hand and adapted to fit only one or more fingers. Similarly, hole 66 may be provided with ridges or grooves adapted to conform to fingers. When grip 62 is provided by a taper, the handle region may include a taper in one or more dimensions. As illustrated, facilitator 30 includes a tapered width. Additionally or alternatively, handle region 36 may include a tapered depth, or thickness. In some configurations, the taper, or the slope thereof, may be adapted to conform to a user's hand. For example, the taper may include finger grooves or may include an ergonomic incline to assist the user in manipulating the facilitator.

With continued reference to FIG. 4, facilitator 30 includes a web coupling region 40. Web coupling region 40 is disposed between handle region 36 and receiving region 38. The space between handle region 36 and receiving region 38 may include a body region 68. Web coupling region 40 may be disposed within body region 68 or may be more closely associated with, or disposed in, receiving region 38 or handle region 36. In some configurations of facilitator 30, web coupling region 40 may be provided with a passage 70, such as illustrated in FIG. 4. Passage 70 may be adapted to conform to the width and thickness of conventionally belt webbing provided in conventional passenger restraint systems. Web coupling region 40 is configured to provide sliding movement along belt webbing 16. Additionally, web coupling region 40 may be configured to provide frictional resistance to sliding when facilitator 30 is in certain orientations. For example, when facilitator is in an upright orientation, such as shown in FIG. 1, coupling region 40 may provide enough frictional resistance to sliding movement that facilitator 30 may remain at a fixed location. When coupling region 40 is configured to provide frictional resistance, facilitator 30 may be said to include a sliding orientations and a fixed orientation.

Facilitator 30 may be formed from any suitable materials, with plastics and other lightweight materials being exemplary. Methods of manufacturing facilitator 30 may vary depending on the materials selected for construction. Injection molding has been found to be a suitable method of manufacturing facilitators according to the present disclosure. In addition to the customary benefits of injection molding processes, injection molding may be particularly advantageous for manufacturing facilitators 30 due to the ability to create a single mold for the general configuration of facilitator 30 and to use varied slide inserts to form the internal components of receiving region 38, such as structural features on top wall 56, side walls 54, back wall 52, and flanges 60. The use of different slide inserts enables a single mold to form facilitators compatible with multiple vehicle manufacturers and restraint system manufacturers.

Figure 5:
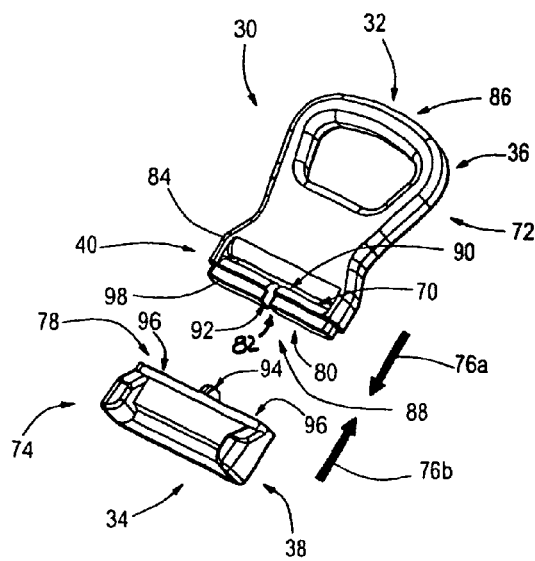
FIG. 5 is a schematic perspective view of a seat belt facilitator according to the present disclosure illustrating a handle member and a receiving member coupled to form the facilitator.

Turning now to FIG. 5, facilitator 30 is illustrated as comprising two cooperating members: a handle member 72 and a receiving member 74. Handle member 72 may include a handle region 36 as described above. Similarly, receiving member 74 may include a receiving region 38 as described above. Additionally, facilitator 30 may be understood to include a handle end 32 and a receiving end 34, as described above. Handle member 72 and receiving member 74 may be adapted to be coupled together by being moved together in the direction of arrows 76*a*, 76*b*. Accordingly, receiving member 74 may include a first coupling region 78 adapted to selectively couple the receiving member to the handle member and handle member 72 may include a second coupling region 80 adapted to selectively couple the handle member to the receiving member.

In some configurations of facilitator 30, the handle member and the receiving member may be adapted to provide a gate 82 for selectively opening the web coupling region, discussed above, to enable the facilitator to be coupled to or uncoupled from the belt webbing. Accordingly, in some configurations, handle member 72 and receiving member 74 may include temporary or selective coupling structures such that a user may couple the members together during use and uncouple the members to store them once the passenger restraint system is properly secured and adjusted. Any suitable selective coupling structure may be used to provide the ability to selectively couple and uncouple the facilitator. Selective coupling features may be particularly preferred for users applying passenger restraint systems to infant seats where the seat of the vehicle is not always used for infant seats.

In other configurations, handle member 72 and receiving member 74 may be adapted to provide a substantially permanent assembly once being coupled together. Any suitable method of substantially permanently coupling the two members may be employed. For example, adhesives, welds, fasteners, or a variety of mechanical systems may be employed. A substantially permanent assembly may be particularly desirable for applications where facilitator 30 is used to apply restraint systems to prisoners.

As indicated, handle member 72 and receiving member 74 may provide a gate 82 to web coupling region 40 and belt webbing passage 70. Gate 82 may be formed by the individual members being separated and joined, as illustrated. Additionally or alternatively, gate 82 may be formed by other structures. For example, referring to FIG. 4, a gate may be provided between receiving region 38 and handle region 36 adjacent web coupling region 40, such as along the side of facilitator 30. A selectively opening and closing portion of facilitator 30, whether hinged, pinned, pivoted, snapped, or otherwise coupled to and released from the facilitator, may be configured to provide access to web coupling region 40 and belt webbing passage 70 and may additionally be configured to provide selective or substantially permanent closure of that access. In some configurations, facilitator 30 may include a handle member 72 and a receiving member 74, as well as a releasable side portion.

As illustrated in FIG. 5, web coupling region 40 and belt webbing passage 70 are disposed in handle member 72. In some configurations, handle member 72 may include a body 84, which may be an elongate body. Belt webbing passage 70 and web coupling region 40 may be disposed in body 84. Additionally or alternatively, the web coupling region and the belt webbing passage may be disposed in any part of facilitator 30. For example, receiving member 74 may be provided with a belt webbing passage. Additionally or alternatively, handle member 72 and receiving member 74 may cooperate to form a belt webbing passage, such as by being coupled with an elongate orifice disposed between them.

Handle member 72 may include a grip end 86 adjacent handle region 36 and a coupling end 88 adjacent second coupling region 80. When handle member 72 is configured with web coupling region 40 and belt webbing passage 70 disposed therein, passage 70 may include an oblong orifice 90 and a slot 92 extending from the oblong orifice to coupling end 88. Slot 92 and oblong orifice 90 may be configured to allow handle member to be selectively coupled to belt webbing 16. Other suitable methods of inserting belt webbing 16 into belt webbing passage 70 may be employed, including those discussed elsewhere herein.

When handle member 72, and more particularly second coupling region 80, includes a slot extending to coupling end 88, receiving member 74 may include suitable structure to close the slot or other opening to belt webbing passage 70. FIG. 5 illustrates one exemplary configuration where receiving member 74 includes first coupling region 78 adapted to cooperate with second coupling region 80. Accordingly, where second coupling region includes an open slot 92, first coupling region 78 includes a protruding member 94 adapted to at least substantially fill slot 92 to close the belt webbing passage. In some configurations, protruding member 94 may be adapted to form a substantially continuous surface inside belt webbing passage 70.

Similarly, first coupling region 78 and second coupling region 80 may otherwise be configured to cooperate with each other. In some configurations, the regions may simply abut each other and be joined through adhesives or welding techniques. In other configurations, first coupling region 78 and second coupling region 80 may be provided with a tongue-in-groove type construction where at least one of the first coupling region and the second coupling region includes at least one pocket adapted to accommodate projecting members in the other coupling region. Other structural elements or combinations of elements may similarly be employed to provide structural integrity to the coupling between handle member 72 and receiving member 74.

Figure 6:
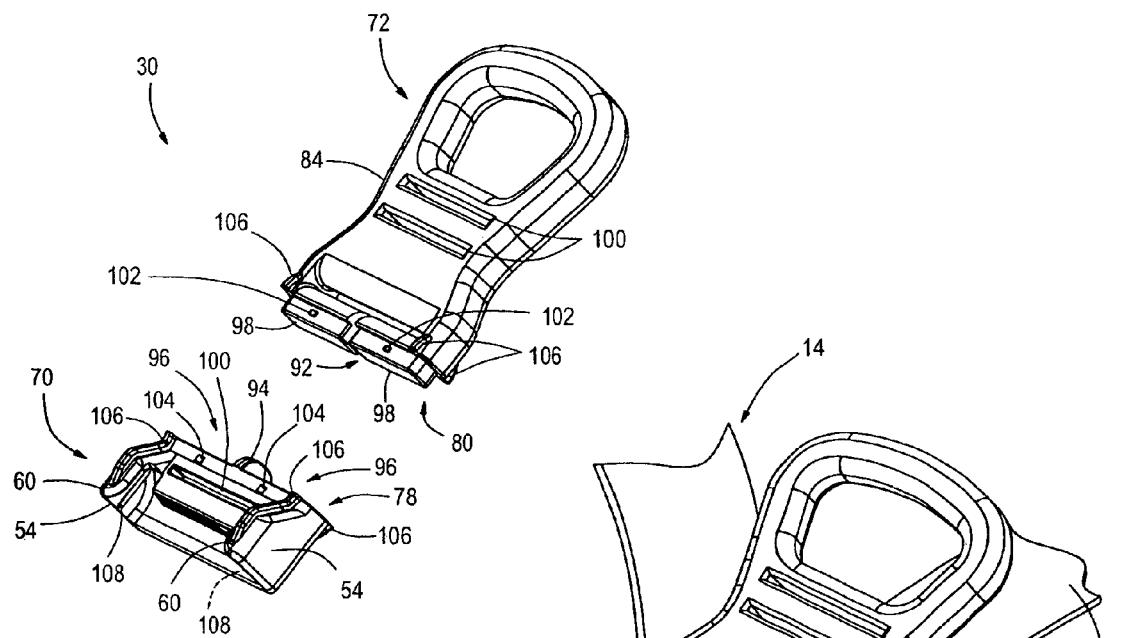
FIG. 6 is a perspective view of a seat belt facilitator according to the present disclosure illustrating a handle member and a receiving region.

With reference to FIG. 6, a perspective view of a facilitator 30 is shown including a handle member 72 and receiving member 74. Facilitator 30 shown in FIG. 6 is a more detailed view of the schematic views discussed above and may include any or all of the elements and features discussed herein. In addition to those elements previously described, FIG. 6 illustrates additional aspects that may be incorporated in facilitators according to the present disclosure. While FIG. 6 illustrates many exemplary features or elements that may be incorporated in facilitators according to the present disclosure, it is not exhaustive and is not limiting. By way of example and not limitation, a variety of auxiliary structures or features may be built into the facilitator or adapted to be coupled to the facilitator. When used to assist parents securing children in toddler seats, toys or other entertainment devices may be secured to or otherwise coupled to the facilitator to prevent the child from throwing the toy to the ground, or enable the child to draw up the toy once it has been thrown. When used to assist police officers secure prisoners in a seat, cinching mechanisms may be coupled to the facilitator to enable the officer to obtain the desired amount of restraint on the prisoner. Facilitators within the scope of the present disclosure may include additional or alternative features or mechanisms similar to or different from the features described herein.

As one example of additional features that may be incorporated in the present facilitators, facilitator 30 is shown in FIG. 6 to include support structures 100. Support structures 100 may be included in facilitators that are constructed as a single body or they may be included in handle members and/or receiving members. Support structures 100 may be adapted to provide strength against bending, twisting, or other forms of deformation. One or more support structures 100 may be included were necessary or appropriate.

In some configurations of facilitators according to the present disclosure, facilitator 30, or some component thereof such as handle member 72, may be of a substantially hollow construction. A substantially hollow construction may reduce the materials cost of facilitator 30 and may additionally reduce the overall weight. In such configurations, the handle member, for example, may be formed of two halves brought together and welded or otherwise joined to form a single handle member. The two halves may include internal support structures. Additionally or alternatively, the support structures on the two halves may cooperate to form externally visible support structures, such as support structures 100. In FIG. 6, support structures 100 are illustrated as rectangular passages through body 84 of handle member 72.

Additionally, FIG. 6 illustrates an exemplary mechanism for selectively and/or substantially permanently coupling handle member 72 and receiving member 74. Handle member 72 includes a second coupling region 80 and receiving member 74 includes a first coupling region 78, substantially as described above. First coupling region 78 includes two pockets 96 separated by protruding member 94. Second coupling region 80 includes two projecting members 98 separated by slot 92. Furthermore, a stop 102 is disposed on each of projecting members 98 and corresponding notches 104 are provided in each of pockets 96. Pockets 96 and projecting members 98, slot 92 and protruding member 94, and stops 102 and notches 104 may each correspond to the other to provide structural support for the coupling between handle member 72 and receiving member 74. Stops 102 and notches 104 are exemplary mechanical structures that may be employed to secure the coupling between handle member 72 and receiving member 74. Other such structures may be employed. Depending on the configuration of the stops and notches and/or on the resiliency of the materials used, the coupling between handle member 72 and receiving member 74 may be rendered substantially permanent or may be selectively opened and closed. While FIG. 6 illustrates stops 102 on handle member 72 and notches 104 on receiving member 74, stops 102 and/or notches 104 may be disposed on either or both of the receiving member and the handle member, so long as each of the stops is aligned with a corresponding notch.

Figure 7:
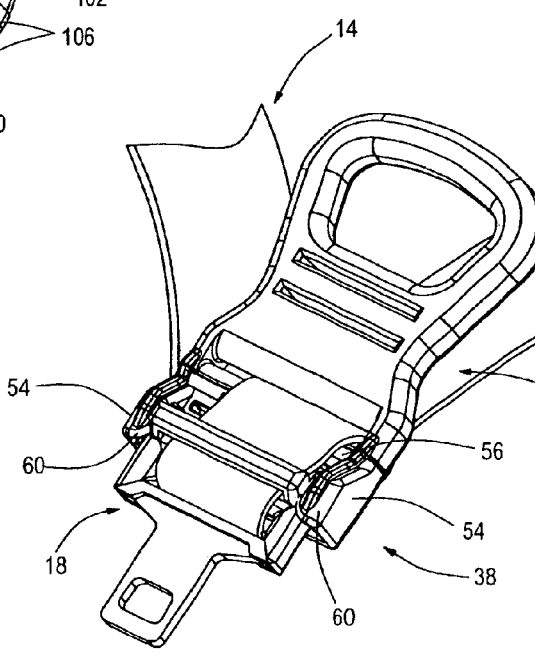
FIG. 7 is another perspective view of a seat belt facilitator according to the present disclosure.

When facilitator 30 is formed by handle member 72 and receiving member 74, first and second coupling regions 78, 80 may include structural supports 106 to strengthen the joint against rotational and/or bending forces that may be applied to the joint. Structural supports 106 may include corresponding upstanding ridges on handle member 72 and receiving member 74. When the corresponding ridges are brought together, such as illustrated in FIG. 7, the structural supports 106 provide resistance to bending or rotation about the axis of the joint between handle member 72 and receiving member 74. By preventing or resisting such rotation about the joint, the coupling between handle member 72 and receiving member 74 is more resistant to breakage and unintentional release.

FIG. 6 further illustrates an inner ridge 108 disposed on each of the opposing side walls 54. Inner ridge 108 is one example of an interior structural feature that may be formed by the slide insert during injection molding of receiving member 74. Inner ridges 108 are also an example of an interior structural feature that may be provided to receiving member 74 to adapt the receiving member to better correspond with specific latch plates. While inner ridge 108 and other interior structural features may be formed by injection molding, other manufacturing techniques may be suitable. For example, side walls 54 and flanges 60 may be sized to accommodate a large latch plate, such that the exterior walls of receiving member 74 or receiving region 38 are substantially consistent for receiving members designed for multiple vehicle lines. Accordingly, as discussed above, a single mold may be used to form facilitators for more than one type of latch plate. However, a large space between back wall 52 and the front wall portions formed by flanges 60 may cause latch plate 18 to fit loosely in receiving region 38. A receiving region configured to loosely receive latch plate 18 is within the scope of the present disclosure and may be configured as a universal receiving member capable of receiving more than one type of latch plate. In some configurations, it may be desirable to have latch plate 18 fit more snugly in receiving region 38. To accomplish a better fit, receiving region 38 may be configured with customized side wall heights and/or customized flanges. Additionally or alternatively, receiving region 38 may include one or more inner ridges 108 disposed on the side walls thereof. Inner ridges 108 may be of customized or standardized lengths and/or widths. The position on the side wall may also be varied to accommodate latch plates of different sizes and configurations. For example, inner ridge 108 may be disposed to properly position a standard latch plate in a Ford vehicle or in a Honda vehicle, which may require different dispositions.

FIG. 7 illustrates a partial view of passenger restraint system 14 including belt webbing 16, latch plate 18, and facilitator 30. Facilitator 30 may be according to any of the configurations described herein. As illustrated, latch plate 18 is releasably coupled to receiving region 38, such as would be the case when facilitator 30 is being used to guide latch plate 18 toward a buckle assembly. FIG. 7 is illustrative of one configuration of the relationship between facilitator 30, belt webbing 16, and latch plate 18. Other configurations are also within the scope of the present disclosure. For example, the path of belt webbing 16 may vary according to the configuration of the passenger restraint system. Similarly, the disposition of latch plate 18 may vary in different restraint system configurations. Variations in either the belt webbing or the latch plate may necessitate variations in their relationship to receiving region 38 and/or facilitator 30. FIG. 7 illustrates one configuration where flanges 60 of side walls 54 include rearward sloping portions, as described above, that cooperate with top wall 56 to receive latch plate 18 and guide it in the direction in which the facilitator is moving. FIG. 7 illustrates just one example of a suitable receiving region.

Figure 8:
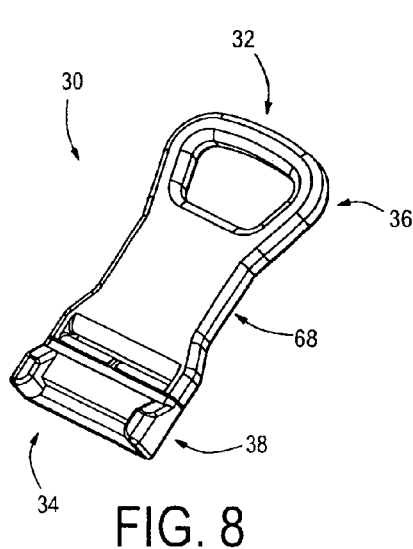
FIG. 8 is a perspective view of another seat belt facilitator according to the present disclosure.

FIG. 8 illustrates a perspective view of another facilitator 30 within the scope of the present disclosure. As described above, facilitator 30 may include handle region 36 and a receiving region 38. Additionally and as discussed above, facilitator 30 may include a body region 68, which may be elongated as shown in FIG. 8. In facilitators including a handle member and receiving member, body region 68 may be disposed in either member. The extent to which body region 68 is elongated may vary according to user preference, automobile or restraint system configuration, or intended usage of the facilitator. For example, facilitator 30 may be provided with an elongated body region when facilitator 30 is adapted to enable a user to thread a belt webbing and a latch plate through an infant seat. Additionally or alternatively, an elongate body region may be desirable when facilitator 30 is used to fasten and adjust the restraint system around a particularly dangerous criminal. Body region 68 may be adapted to any length suitable for the intended use of facilitator 30. In some configurations, body region 68 may be adapted to provide an overall facilitator length (between handle end 32 and receiving end 34) of greater than about four inches. In some configurations, the overall facilitator length may range from about four inches to about thirty inches. In other configurations, the overall facilitator length may range from about six inches to about twenty-four inches. In still other configurations, such as when configured for use by police officers, the overall facilitator length may range from about six inches to about twelve inches.

A seat belt facilitator for use with a passenger restraint system may also be described as including a receiving means for selectively coupling the facilitator to the latch plate of the restraint system; a sliding means for slidably coupling the facilitator to the belt webbing of the restraint system; and a handle means for gripping the facilitator and guiding the facilitator along the belt webbing. As discussed above, the facilitator is adapted to allow a user to couple the latch plate to the buckle assembly from a remote position. Receiving region 38 and receiving member 74 are illustrative, but not limiting, examples of a receiving means. Other examples not illustrated in the figures include a receiving region formed of two or more component parts or receiving regions with greater or fewer features than shown or described above. Handle region 36 and handle member 72 are illustrative, but not limiting, examples of a handle means. Additional or alternative handle means may be provided by varying the shape, size, or configuration of the handle region described above and are with the scope of the present disclosure. Similarly, web coupling region and belt webbing passage are illustrative, but not limiting, examples of a sliding means. Any suitable structure or combination of structural features may be employed to slidably and, in some configurations, selectively couple the facilitator to the belt webbing.

Seat belt facilitators within the scope of the present disclosure may be used to aid a user in applying a passenger restraint system around another person or object. Various methods of using the facilitator are possible, some of which have been described above. One such method includes slidably coupling a seat belt facilitator having a handle region and a receiver region to a belt webbing and sliding at least one of the latch plate and the facilitator toward the other to selectively dispose at least a portion of the latch plate in the receiving region. Upon releasably coupling the latch plate and the facilitator, the facilitator may be moved toward the buckle assembly to cause the latch plate to engage the buckle and selectively secure the latch plate to the buckle assembly. After fastening the restraint system, a user may move the facilitator to another position on the belt webbing or may uncouple the facilitator from the belt webbing for storage. In some applications, a user may release the latch plate from the receiving region by moving the facilitator away from the buckle assembly. Additionally, a user may use the facilitator to engage the ratchet mechanism of a retractor assembly by moving the facilitator away from the buckle assembly and/or the retractor assembly. When the facilitator is used to adjust the length of the belt webbing and the fit of the restraint system around the occupant or other object, the user may then release the facilitator to allow the retractor assembly to retract substantially all unneeded belt webbing length. Other methods of using the facilitator are within the scope of the present disclosure.

Seat belt facilitators and passenger restraint systems according to the present disclosure are applicable to the automotive and transportation industries and other industries where an occupant is restrained in a seat.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

Although the present invention has been shown and described with reference to the foregoing operational principles and preferred embodiments, it will be apparent to those skilled in the art that various changes in form and detail may be made without departing from the spirit and scope of the invention. The present invention is intended to embrace all such alternatives, modifications and variances that fall within the scope of the appended claims.

I claim:

1. A seat belt facilitator for use with a passenger restraint system having a belt webbing, a latch plate coupled to the belt webbing, and a buckle assembly adapted to be releasably coupled to the latch plate, the facilitator comprising:

a latch plate receiving region adapted to releasably couple the facilitator to the latch plate, wherein the latch plate receiving region includes a back wall, a top wall, a first and a second opposing side wall, and a substantially open front region, and wherein the substantially open front region is adapted to not interfere with the belt webbing adjacent the latch plate, and wherein each of the opposing side walls includes an inwardly extending flange portion adapted to close at least a portion of the front region and to selectively receive the latch plate;

a web coupling region adjacent the latch plate receiving region and adapted to slidably couple the facilitator to the belt webbing; and a handle region separated from the receiving region at least by the web coupling region;

wherein the facilitator is adapted to enable a user to couple the latch plate to the buckle assembly from a position remote from the buckle assembly.

2. The seat belt facilitator of claim 1, wherein the handle region includes a grip having a hole therethrough.

3. The seat belt facilitator of claim 1, wherein the facilitator has an overall facilitator length of at least 4 inches.

4. The seat belt facilitator of claim 3, wherein the handle region is separated from the receiving region by a body region.

5. The seat belt facilitator of claim 4, wherein the web coupling region is disposed within the body region.

6. The seat belt facilitator of claim 3, wherein the overall facilitator length is between 6 inches and 24 inches.

7. The seat belt facilitator of claim 1, wherein each of the opposing side walls includes an inner ridge disposed between the back wall and the inwardly extending flange, wherein inner ridges of the opposing side walls are adapted to position the latch plate within the receiving region.

8. A seat belt facilitator for use with a passenger restraint system having a belt webbing, a latch plate coupled to the belt webbing, and a buckle assembly adapted to be releasably coupled to the latch plate, the facilitator comprising:

a latch plate receiving member adapted to releasably couple the facilitator to the latch plate;

a handle member adapted to be selectively coupled to the latch plate receiving member; and a belt webbing passage disposed in at least one of the latch plate receiving member and the handle member and adapted to selectively and slidably couple the facilitator to the belt webbing, wherein the facilitator is adapted to enable a user to couple the latch plate of the passenger restraint system to the buckle assembly from a position remote from the buckle assembly;

wherein the latch plate receiving member includes a receiving region adapted to releasably couple the facilitator to the latch plate and a first coupling region adapted to selectively couple the latch plate receiving member to the handle member, wherein the handle member includes a second coupling region adapted to selectively couple the handle member to the latch plate receiving member; and wherein the receiving region of the latch plate receiving member includes a back wall, a top wall, a first and a second opposing side wall, and a substantially open front region; and wherein the substantially open front region is adapted to not interfere with the belt webbing adjacent the latch plate.

9. The seat belt facilitator of claim 8, wherein each of the opposing side walls includes an inwardly extending flange portion adapted to close at least a portion of the front region and to selectively receive the latch plate.

10. The seat belt facilitator of claim 8, wherein each of the opposing side walls includes an inner ridge disposed between the back wall and the inwardly extending flange, wherein the inner ridges are adapted to position the latch plate within the receiving region.

11. The seat belt facilitator of claim 8, wherein the handle member includes an elongate body.

12. The seat belt facilitator of claim 11, wherein the facilitator has an overall facilitator length of between about 4 inches and about 24 inches.

13. The seat belt facilitator of claim 12, wherein the belt webbing passage is disposed in the elongate body of the handle member.

14. The seat belt facilitator of claim 8, wherein the handle member include a grip end and an opposed coupling end adjacent the second coupling region, wherein the belt webbing passage includes an oblong orifice through the handle member adjacent the second coupling region, and wherein the belt webbing passage further includes a slot extending from the oblong orifice through the second coupling region to the coupling end of the handle member; and wherein the slot and oblong orifice are adapted to allow the handle member to be selectively and slidably coupled to the belt webbing when the handle member is uncoupled from the latch plate receiving member.

15. The seat belt facilitator of claim 14, wherein the first coupling region of the latch plate receiving member includes a protruding member adapted to substantially fill the slot of the web passage assembly in the handle member to close the oblong orifice.

16. The seat belt facilitator of claim 8, wherein at least one of the first coupling region and the second coupling region includes at least one stop, and wherein the at least one of second coupling region and the first coupling region includes at least one notch corresponding to the at least one stop to secure the latch plate receiving member to the handle member.

17. The seat belt facilitator of claim 8, wherein the belt webbing passage is cooperatively formed at least by a portion of the latch plate receiving member and a portion of the handle member.

18. The seat belt facilitator of claim 8, wherein the handle member includes a grip having a hole therethrough.

19. The seat belt facilitator of claim 8, wherein the handle member and the latch plate receiving member are adapted to be substantially permanently coupled together once the first coupling region and the second coupling region are brought together.

20. The seat belt facilitator of claim 8, wherein at least one of the handle member and the latch plate receiving member include at least one structural support adapted to strengthen the assembled facilitator where the first coupling region and the second coupling region come together.

21. The seat belt facilitator of claim 1, wherein the web coupling region is disposed between the latch plate receiving region and the handle region.

* * * * *